US009637230B2

(12) United States Patent
Bertelsen

(10) Patent No.: US 9,637,230 B2
(45) Date of Patent: May 2, 2017

(54) AIRCRAFT AND CONVERTIBLE WING ASSEMBLY

(71) Applicant: Bertelsen Design LLC, Bay City, MI (US)

(72) Inventor: William D. Bertelsen, Bay City, MI (US)

(73) Assignee: Bertelsen Design LLC, Bay City, MI (US)

( * ) Notice: Subject to any disclaimer, the term of this patent is extended or adjusted under 35 U.S.C. 154(b) by 327 days.

(21) Appl. No.: 14/205,424

(22) Filed: Mar. 12, 2014

(65) Prior Publication Data

US 2016/0121995 A1    May 5, 2016

Related U.S. Application Data

(60) Provisional application No. 61/787,999, filed on Mar. 15, 2013.

(51) Int. Cl.
*B64C 39/06* (2006.01)
*B64C 29/00* (2006.01)
*B64C 3/38* (2006.01)

(52) U.S. Cl.
CPC .......... *B64C 29/0025* (2013.01); *B64C 3/385* (2013.01); *B64C 39/066* (2013.01); *B64C 39/068* (2013.01); *Y02T 50/145* (2013.01)

(58) Field of Classification Search
CPC ..... B64C 27/22; B64C 2201/088; B64C 3/38; B64C 3/54; B64C 3/285; B64C 5/02
See application file for complete search history.

(56) References Cited

U.S. PATENT DOCUMENTS

| 3,361,388 | A | 1/1968 | Girard et al. |
| 3,572,614 | A | 3/1971 | Bertelsen |
| 4,415,131 | A | 11/1983 | Bertelsen et al. |
| 4,601,443 | A | 7/1986 | Jones et al. |
| 7,377,470 | B2 * | 5/2008 | Miyake ................ A63H 27/007 244/190 |

(Continued)

FOREIGN PATENT DOCUMENTS

| GB | 324931 A | * | 2/1930 | ............... B64C 3/54 |
| GB | 506136 A | * | 5/1939 | ............... B64C 3/84 |

OTHER PUBLICATIONS

Advanced Technology Deflected Slipstream, not earlier than Mar. 3, 2004 (23 pages).

(Continued)

*Primary Examiner* — Benjamin P Lee
(74) *Attorney, Agent, or Firm* — Reising Ethington P.C.

(57) ABSTRACT

In at least some implementations, an aircraft includes a fuselage, a wing spar rotatably carried by the fuselage, a first wing element and a second wing element. The first wing element is carried by the wing spar, rotatable with the wing spar, and slidably moveable relative to the fuselage and wing spar. The second wing element is connected to the first wing element for pivoted movement of the second wing element relative to the first wing element. The second wing element at least partially overlaps the first wing element and the first and second wing elements are moveable to a plurality of positions wherein the amount that the second wing element overlaps the first wing element varies to vary the effective combined wing area of the wing elements.

20 Claims, 9 Drawing Sheets

(56) References Cited

U.S. PATENT DOCUMENTS

| | | |
|---|---|---|
| 7,510,143 B1 | 3/2009 | Bertelsen et al. |
| 2005/0045765 A1* | 3/2005 | Pitt .......................... B64C 3/40 244/46 |
| 2007/0084971 A1* | 4/2007 | Miyake ................ A63H 27/007 244/190 |

OTHER PUBLICATIONS

William D. Bertelsen; Introduction to the Arcopter Arc Wing; Science and Technology of Low Speed and Motorless Flight, NASA Conference Publication 2085, Part I; Mar. 29-30, 1979 (15 pages).
Perry W. Hanson; Science and Technology of Low Speed an Motorless Flight, NASA Conference Publication 2085, Part I; Mar. 29-30, 1979 (28 pages).

* cited by examiner

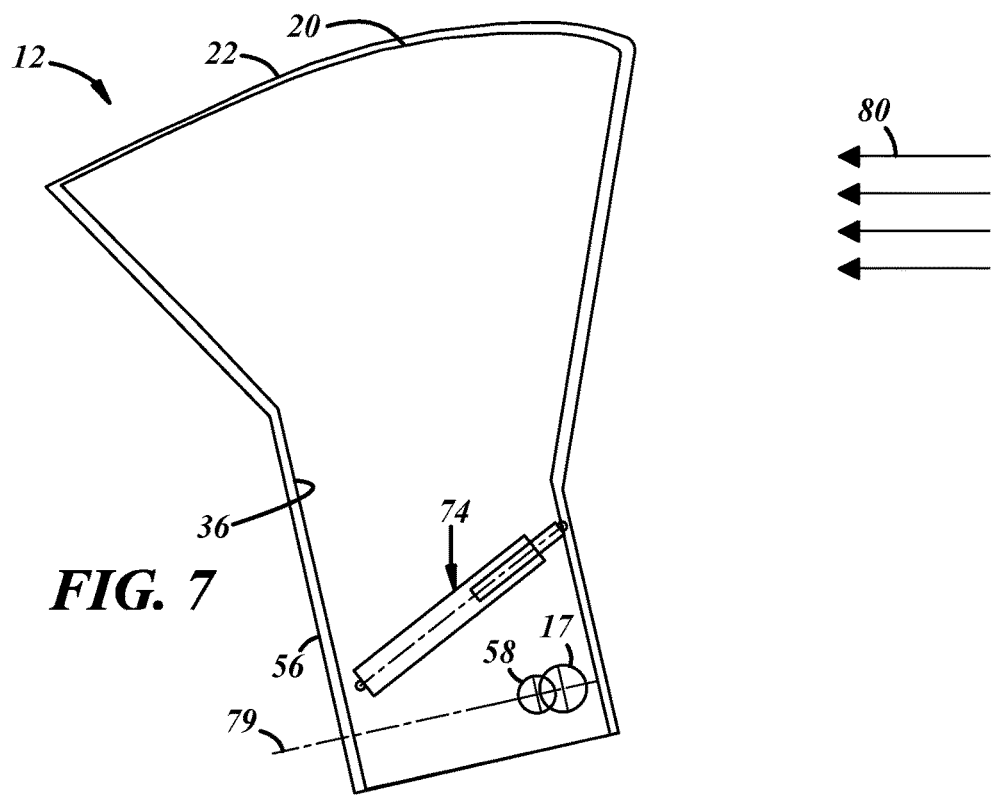
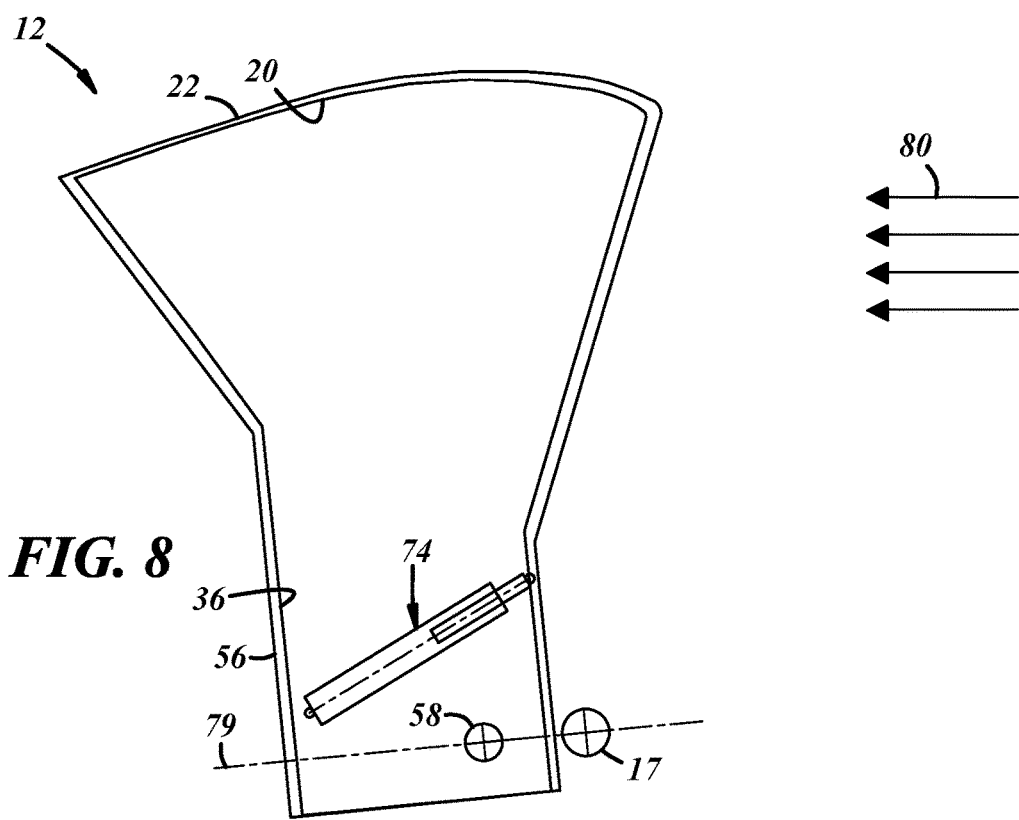

FIG. 9
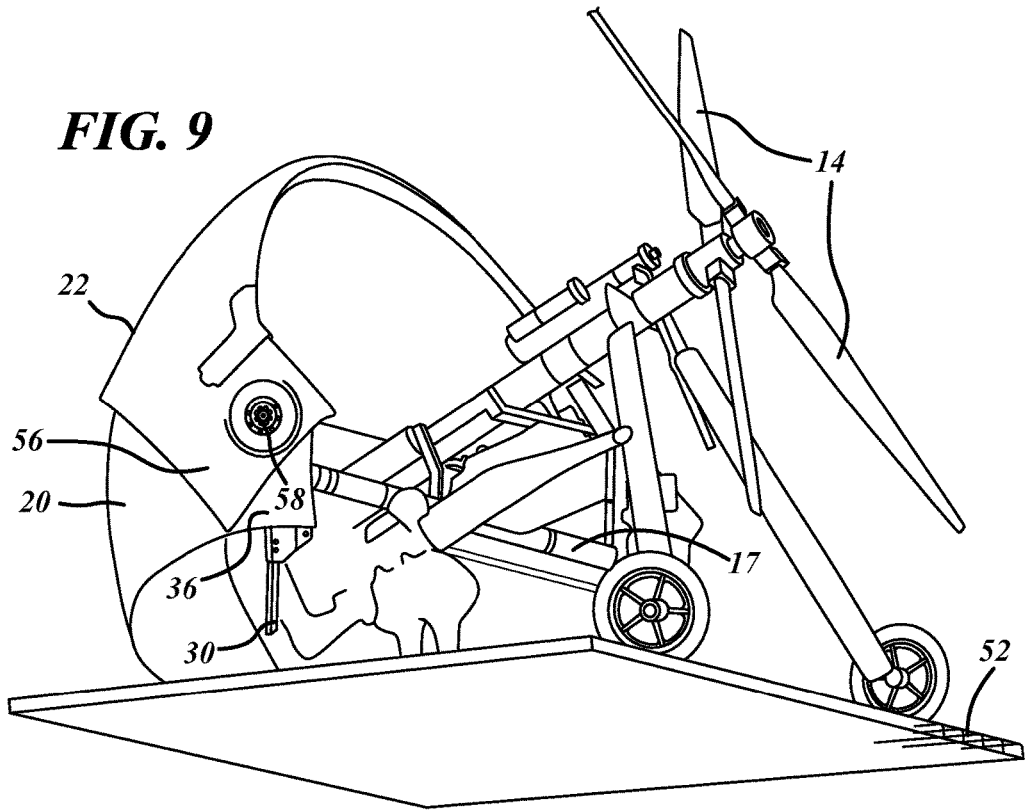
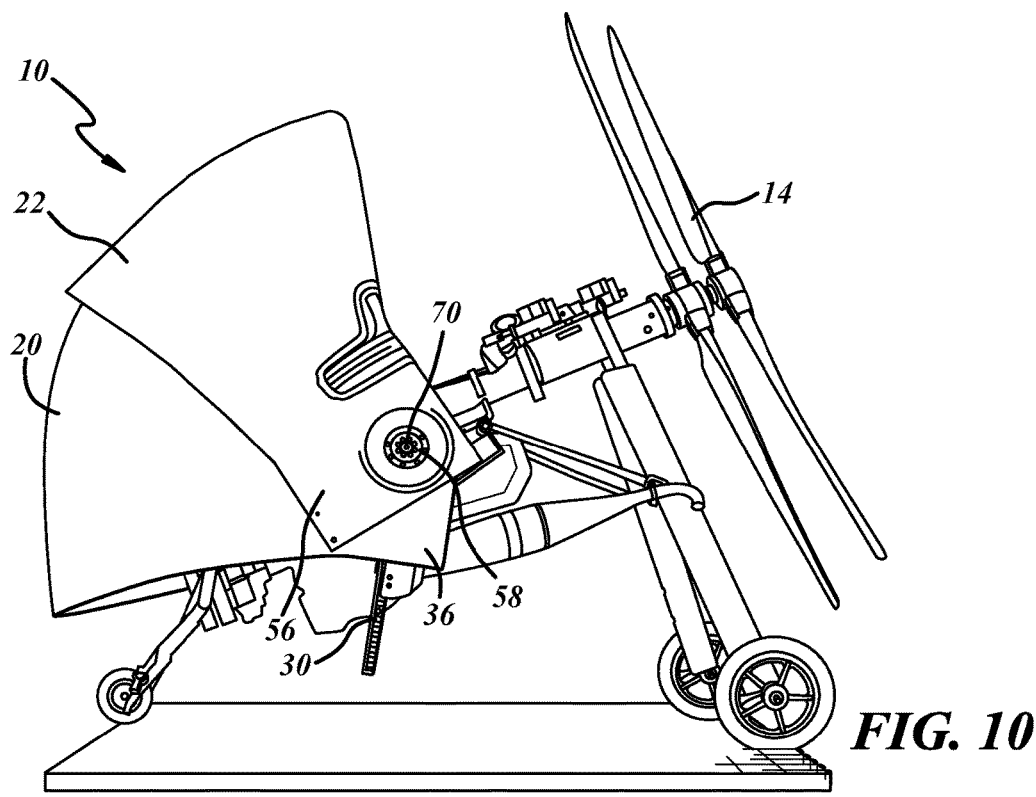
FIG. 10

AIRCRAFT AND CONVERTIBLE WING ASSEMBLY

REFERENCE TO CO-PENDING APPLICATION

This application claims the benefit of U.S. Provisional Application No. 61/787,999 filed Mar. 15, 2013, which is incorporated herein by reference in its entirety.

TECHNICAL FIELD

This disclosure relates generally to aircraft and a wing assembly for aircraft.

BACKGROUND

Aircraft able to operate in different flight modes, for example, high lift modes including vertical or near vertical take-off and landing and high speed modes providing efficient cruising, face many challenges. Aircraft employing an airfoil in a slipstream of a propeller to achieve vertical takeoff and landing (VTOL) are known. Aircraft of this type have been met with varied success due to the challenges in transitioning between vertical flight and normal horizontal flight. When transitioning between the vertical and horizontal flight, pitch control, pitch trim and pitch stability are difficult to regulate, thereby providing a pilot with extremely difficult flying challenges.

SUMMARY

In at least some implementations, an aircraft includes a fuselage, a wing spar rotatably carried by the fuselage, a first wing element and a second wing element. The first wing element is carried by the wing spar, rotatable with the wing spar, and slidably moveable relative to the fuselage and wing spar. The second wing element is connected to the first wing element for pivoted movement of the second wing element relative to the first wing element. The second wing element at least partially overlaps the first wing element and the first and second wing elements are moveable to a plurality of positions wherein the amount that the second wing element overlaps the first wing element varies to vary the effective combined wing area of the wing elements.

In at least some implementations, a wing assembly for an aircraft, includes a first wing element and a second wing element. The first wing element has a pair of wing tips, and an arcuate shape along at least a portion of its span between the wing tips. The second wing element has a pair of wing tips pivotably connected to the wing tips of the first wing element, an arcuate shape along at least a portion of its span between its wing tips and is nestably received over the first wing element to a varying degree between a first position and a second position of the wing assembly.

BRIEF DESCRIPTION OF THE DRAWINGS

The following detailed description of preferred embodiments and best mode will be set forth with reference to the accompanying drawings, in which:

FIGS. 1-8 are schematic side views of one implementation of a wing assembly having at least partially nestable first and second wing elements;

FIG. 9 is a perspective view of one implementation of an aircraft using a wing assembly like that shown in FIGS. 1-8;

FIG. 10 is a side view of the aircraft showing the wing assembly in a first position, like FIG. 1, such as may be used for takeoff or hover operation of the aircraft;

DETAILED DESCRIPTION OF PREFERRED EMBODIMENTS

Figure 1:
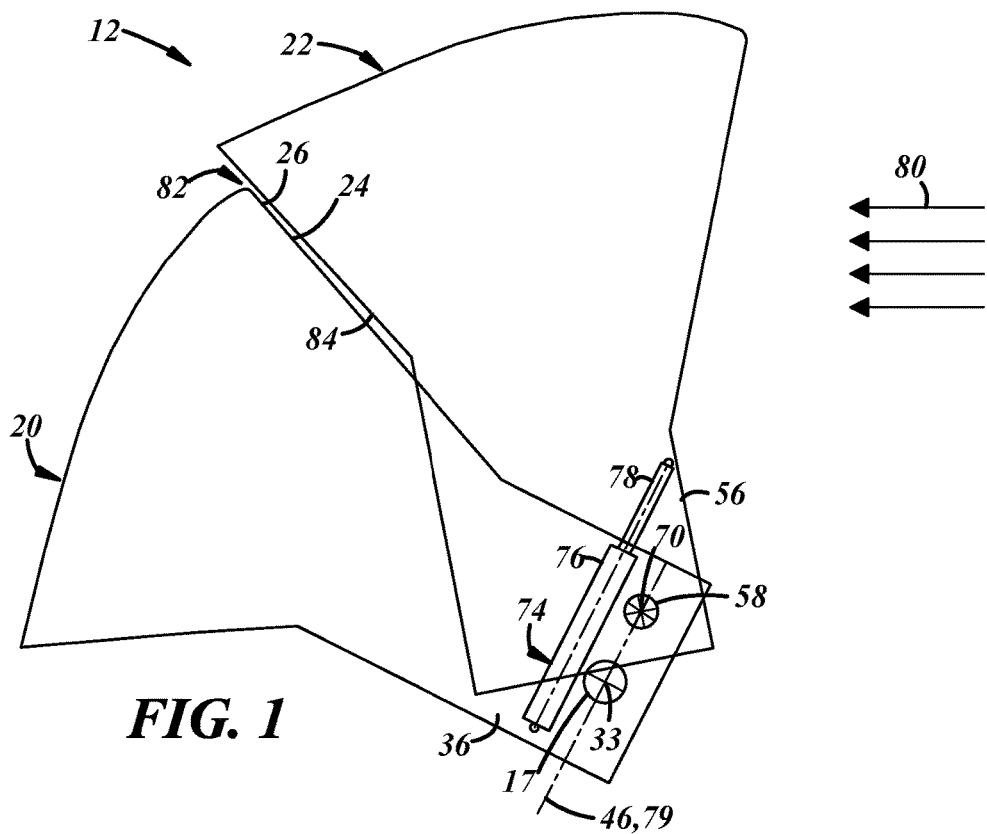

Referring in more detail to the drawings, FIGS. 9-14 illustrate an aircraft 10 having one presently preferred embodiment of a wing assembly 12. The wing assembly 12 is disposed in a slipstream of a source of propulsion, represented here, by way of example and without limitations, as a propeller or pair of counter-rotating propellers 14 carried by a body or fuselage 16. The wing assembly 12 could include a flap or flaps to facilitate re-direction or deflection of the propeller slipstream to generate lift. The wing assembly 12 is carried by the fuselage 16 on a horizontal, rotatable spar 17 (FIGS. 1-8, 9, 11 and 15) and is moveable for generally linear translation and pivotal movement relative to the fuselage 16 to provide the aircraft 10 with a variety of in-flight modes of operation. For example, the wing assembly 12, when oriented in one position, provides the aircraft 10 with an ability to fly straight vertically, which is generally desirable for vertical takeoffs and landings, and when oriented in another position, enables the aircraft 10 to fly horizontally, such as during a cruise or normal operating mode of flight. The wing assembly 12 provides the aircraft 10 with pitch and yaw stability, without a tail (e.g. when the wing spar 17 is locked against rotation), as a result of a dynamic lift/drag force balance about a horizontal axis 33 extending between opposite wing tips of the wing assembly 12.

FIGS. 1-8 illustrate one implementation of the aircraft wing assembly 12, and FIGS. 9-14 illustrate one implementation of an aircraft 10 that includes such a wing assembly. The wing assembly 12 may include first and second wing elements 20, 22 that are movable relative to each other about one or more pivots 58. The first wing element 20 may nest at least partially within the second wing element 22. In use, the wing elements 20, 22 may rotate with the wing spar to change their angle of attack with respect to an airflow, and the wing elements 20, 22 may be increasingly or decreasingly nested together to change the effective surface area of the combined wing elements. The nesting may be accomplished, for example, by retracting or extending one wing element relative to the other wing element. Of course, both wing elements 20, 22 may be moved, as desired. This permits variance in the angle of attack and lift of the wing assembly 12 to permit various modes of flight such as vertical or short takeoffs, as well as relatively high-speed cruising.

The first wing element 20 may be similar to the type illustrated in FIGS. 11-14 of U.S. Pat. No. 7,510,143 (the '143 patent), the disclosure of which is incorporated herein by reference in its entirety. The first wing element 20 may consist of one or more airfoil elements arranged radially in a generally semi-circular arc. In at least some implementations, the first wing element 20 is tapered but unswept, with the maximum wing chord in a center portion, as suggested by the plan view of FIG. 12 of the '143 patent, where the planform projection of the wing approximates an ellipse. Setting the maximum center-element wing chord at about ⅓ to ½ the wing element span has been found to work satisfactorily, although other dimensions are possible.

The first wing element 20 could be of composite construction or other suitable light-weight materials, and can be considered a semi-rigid tension structure. As such, the first wing element 20 can be a thin shell that incorporates only the leading edge 24 and upper (low-pressure) contour 26 of a chosen airfoil. The basic structure could be easily fabricated from either a male or female mold. To minimize drag at high speed, the curvature of the upper airfoil contour 26 could be partially or completely faired in, as indicated in the profile view of FIG. 11 of the '143 Patent.

Figure 15:
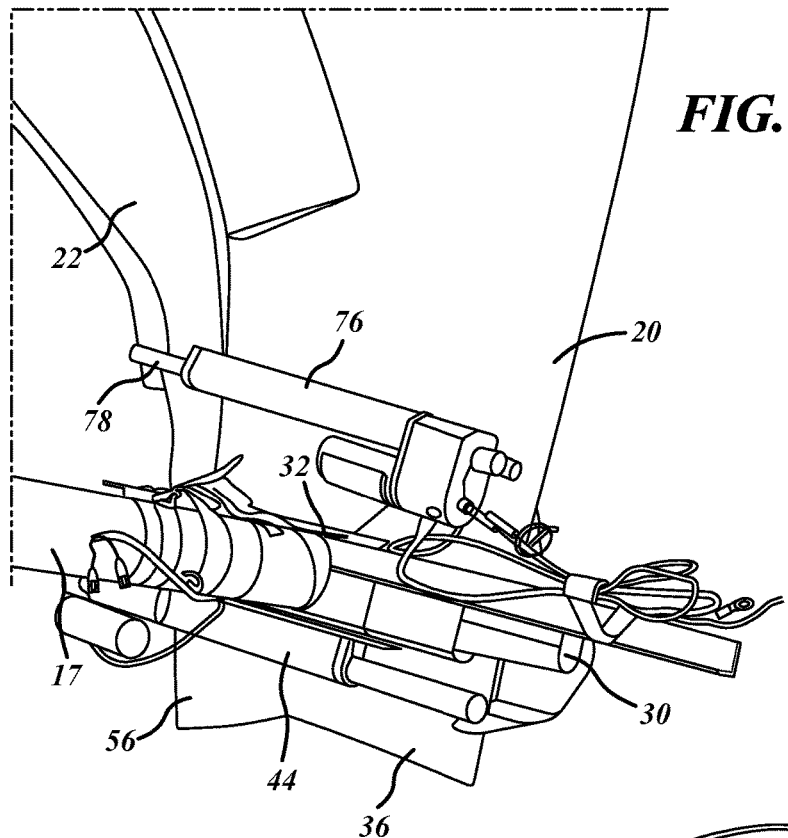
FIG. 15 is a fragmentary perspective view showing a wing spar, linear slide and actuator, and a wing element actuator.
Figure 16:
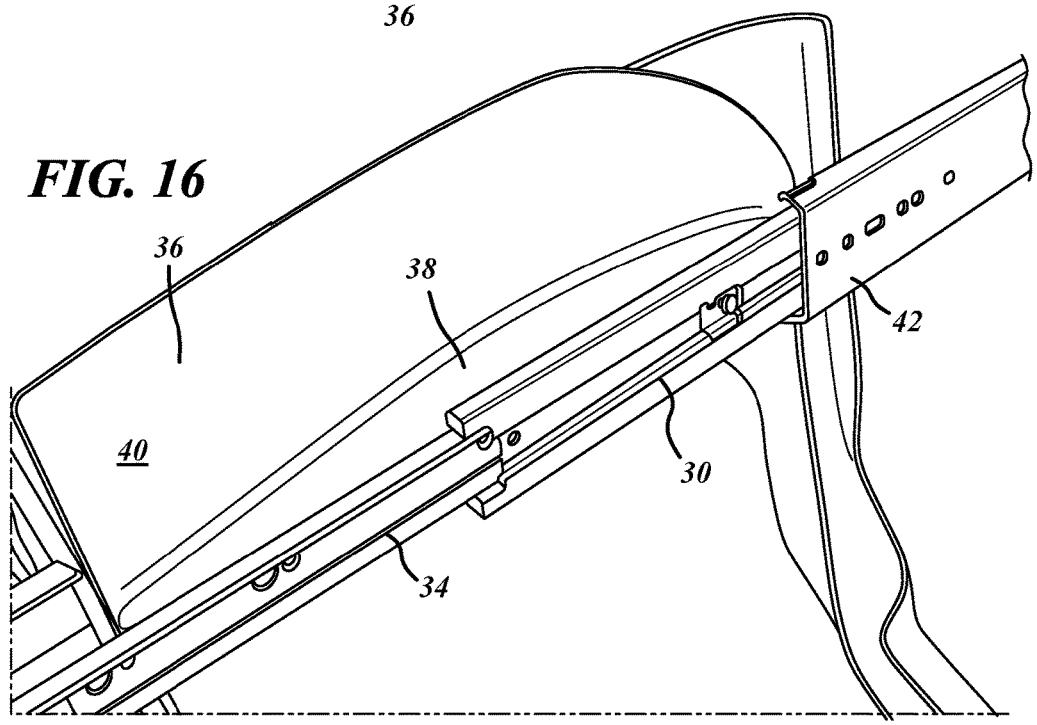
FIG. 16 is a fragmentary view showing a linear slide being assembled onto a wing tip.

The first wing element 20 of this provisional application will be referred to later as the "inner shell" since it may be received partially or fully within the second wing element 22, which in turn may be referred to as the "outer shell." The first wing element 20 may be slidably mounted to the wing spar 17, such as by coupling wing tips to a pair of linear slides 30 (e.g. ball bearing/linear track slides), each fixed to cap plates 32 on opposite ends of the tubular spar 17, which is rotatable about its longitudinal axis 33. As shown in FIGS. 15 and 16, the slides 30 may include an inner race 34 (moveable portion) that is secured to a wing tip 36, and if desired, a stiffening rib 38 may be provided on or in the airfoil contour of the inner surface 40 of each wing tip 36 to better support the loads placed thereon in use. The outer, non-moving casings 42 of the slides 30 are secured to the cap plates 32 on opposite ends of the spar 17. As such, the wing element 20 can shift freely fore and aft with respect to the spar 17, and such translation may be driven by linear actuators 44 fixed to each spar end cap plate 32 in the manner shown and described with reference to the embodiment of FIGS. 14 and 16 of the '143 patent. In one presently preferred implementation, the axes 46 of the slides 30 are parallel to each other and at right angles to the wing spar 17. And the slides 30 are positioned so as to intersect the longitudinal axis of rotation 33 of the tubular spar 17. Of course, other orientations and arrangements are possible.

The wing tips 36 of the first wing element 20 are attached to the moveable inner race 34 of the linear slides 30 which may be positioned so that the chord line of the center-element airfoil is generally parallel to the slide axis 46. In one implementation of a semi-circular arc wing element 20, it was found to be beneficial if the chord-wise stiffening ribs 38 that attach to the inner race 34 of the slides 30 are at a level on the wing tips 36 corresponding to approximately one arc radius below the center-element chord line of the first wing element 20. Other arrangements and orientations are possible.

The range of sliding movement permitted by the slides 30 may be discussed with regard to a reference point on the wing tips 36 and with respect to a reference point on the wing spar 17, and may be stated as a percent of the maximum wing chord length (c). In this discussion, the center of the wing tip chord and the center of the wing spar 17 serve as the position references. Success in verifying the stability and control claims of the '143 patent has been achieved with a large, powered research model having a 6-foot-span and a 36-inch maximum main wing chord length. The research model is represented in FIGS. 9-17, and is shown in many of these pictures strapped down on a wire/mesh platform 52 that facilitated testing the model out of ground effect. With the wing assembly 12 in second position as in FIGS. 5-8 and 14, a broad range of stable wing angles was attained in the slipstream of the 76-inch-diameter dual-rotating propellers 14 of the research model by allowing the center of the wing-tip chord to traverse from a position approximately 1.5 inches (4.2% c) ahead of the center of the wing spar to a position 11.5 inches (32.0% c) aft of the center of the wing spar 17. Other distances are possible, including but not limited to those set forth in the '143 patent, for example, at column 6, lines 3-11.

To increase the total lift of the wing assembly 12 so that, at least in some implementations, vertical or at least near vertical takeoff is possible, preferably without extreme nose-up angles, the second wing element 22 may comprise a second arc wing section. The second wing element 22 may be slightly larger than the first wing element 20, and effectively defines an outer shell that may be received relatively closely over the first wing element 20. Indeed, if desired, the second wing element (outer shell) 22 can be fabricated by molding it directly over the first wing element (inner shell) 20, so that the two wing elements nest together within desired tolerances. In some implementations, the molding of the second wing element 22 includes multiple layers of fabric wrapped around the leading edge 24 of the first wing element 20 to create a leading-edge curl for the second wing element 22 that adds stiffness.

Figure 17:
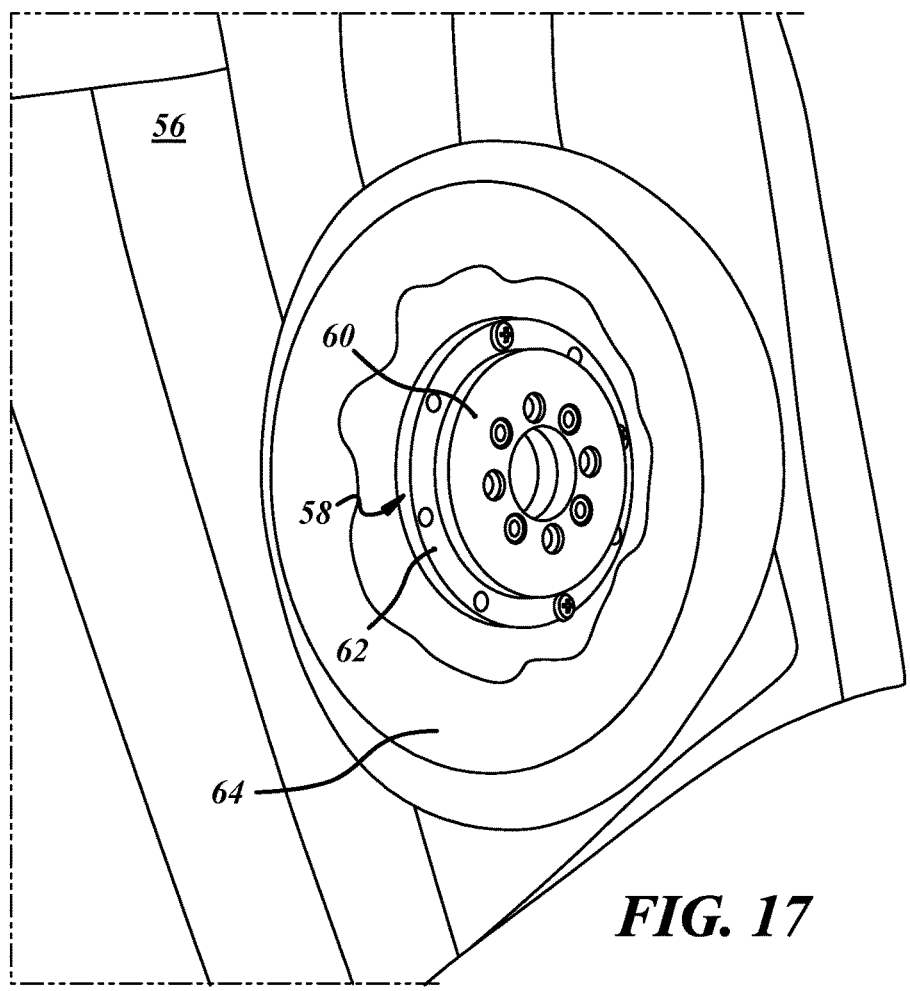
FIG. 17 is a fragmentary view showing a wing tip of a second wing element with a pivot bearing coupled to it.
Figure 18:
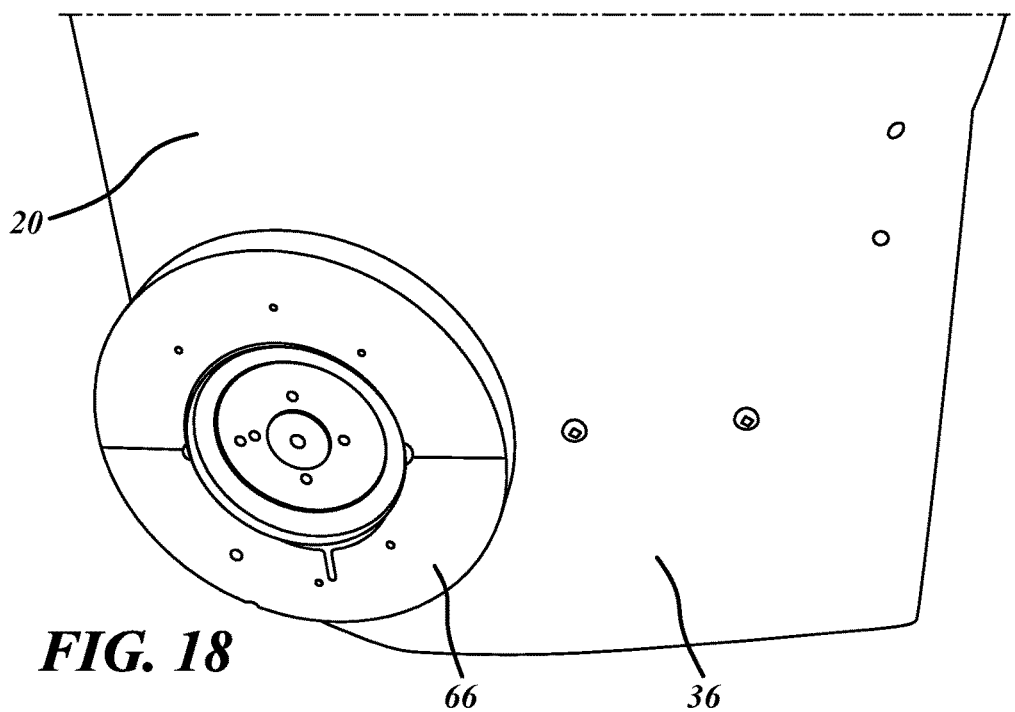
FIG. 18 is a fragmentary view showing a wing tip of the first wing element with a bearing boss for attachment to a pivot bearing.

The outer shell 22 may be conjoined at its wing tips 56 to the inner shell wing tips 36, such as by a pivot 58 that permits relative pivoted motion between the inner and outer shells 20, 22. In at least one form, the inner and outer shells 20, 22 are attached to the relatively rotatable inner and outer races 60, 62 of a slewing-ring bearing that defines a pivot 58, with one bearing provided at the juncture of each of the wing tips 36, 56. The pivot bearings 58 may be situated at the level of the linear slides 30, if desired, to provide clearance between the shells 20, 22 and provide an acceptable slot gap between them. In operation, the outer shell 22 may rotate forward with respect to the inner shell 20 to increase the total effective wing area and lift. Therefore, the outer shell 22 may technically be considered a slat rather than a flap. As shown in FIGS. 17 and 18, the outer, fixed (e.g. non-moving) race 62 of the pivot bearings 58 can be mounted in recesses 64 formed in the inner surface of the outer shell wing tips 56. The rotating inner races 60 of the pivot bearings 58 can attach to the wing tips 36 of the inner shell 20, such as in bearing bosses 66 on the inner shell wing tips 36 over which the recesses 64 are received, but of course, other mountings can be used including mountings that may be concealed and are more streamlined. When attached as shown and described, the planes of rotation of the pivot bearings 58 on opposite sides are parallel to each other and perpendicular to the wing spar 17, so that the axis 70 of the pivots are parallel to the axis of rotation 33 of the wing spar 17. With the pivots 58 at the exterior of the first wing element (inner shell), the multiple-element wing assembly 12 remains free to travel to and fro along the linear bearings 30 and with respect to the wing spar 17.

Depending on the airfoil shape selected for the first wing element 20, the pivot axis 70 may be located on the first wing element tips 36 ahead of the center of the wing tip chord. In the representative model that has been constructed, the pivot axis 70 is ahead of the center of the wing tip chord (relative to direction of forward flight) by approximately 11% c. In other constructions, this percentage may vary between about 5% c and 20% c. This allows pivoted movement (e.g. forward rotation about the pivot) on the order of 0° to 60° without interference with the first wing element 20, and results in a gap between the first and second wing elements 20, 22 that provides a slotted-flap effect at full deployment of the second wing element 22. While the slot gap that results from a simple rotation of the second wing element 22 has been demonstrated to be adequate, this filing is intended to cover adjustments in pivot location and/or possible cam action (that is, non linear movement including rotation about a movable axis) and/or airfoil modifications that might optimize the slot gap to maintain attached flow over the inner shell 20 throughout the range of movement of one or both of the inner and outer shells 20, 22. Of course, the ranges provided herein are given as examples only, and may relate to certain implementations of an aircraft but not necessarily all implementations. The ranges are intended to be illustrative and are not intended to limit the possible alternatives, some of which may fall outside of the noted ranges. Further, the wing assembly may include multiple (e.g. more than two) wing elements, and each may have a different size and/or shape, and each may have a different maximum chord length, as desired.

To rotate the outer shell 22 with respect to the inner shell 20, one or more actuators 74 may be coupled to the outer shell 22. In one implementation, a pair of actuators 74 are installed at the wing tips 56 of the outer shell 22, with one actuator coupled to each wing tip. These can be, but are not limited to, linear actuators with a body 76 and an extendable ram 78. The actuators 74 are distinct from the slide track actuators 44 that shift the entire wing assembly 12 fore and aft with respect to the wing spar 17 (examples of which are shown and described with reference to FIGS. 14 and 16 of the '143 patent). Thus, the pivoted movement of the outer shell 22 may be controlled independently of the wing element movement along the linear slides 30.

The relative movement and actuation of the first and second wing elements 20, 22 to achieve various flight modes (e.g. from vertical takeoff/hover to the high-speed cruise) will now be described with reference to FIGS. 1-8. These figures are profile projections, showing the arc wing assembly 12 from the side, as if seen in X-ray images. That is, the inner shell 20 is visible within the outer shell 22 to more clearly show the movements of each shell. The wing spar 17 and pivot 58 are shown, as is the outer shell actuator 74. Finally, the slide track location and travel direction are indicated by a dashed line 79 and the direction of the airflow at the wing elements from the propeller is shown by the arrows 80.

To serve as a constant reference for delineating the relative motion of the wing assembly 12 and its elements 20, 22 during the conversion process, the center of the wing spar 17 is anchored to the same spot on each of the figures. It will be shown that, although the wing spar 17 does not translate, it does rotate during the conversion sequence of the wing elements 20, 22 between various flight modes.

An aft horizontal stabilizer (not shown) such as the one in FIGS. 1-4 of the '143 patent may be attached to the rear of the fuselage 16 and wing-spar support structure to stabilize the airframe in pitch during the portions of the conversion when the velocity of the free air stream is significant and the wing spar 17 is unlocked and free to rotate. The horizontal stabilizer could be mounted on an aft vertical fin, if the airframe more closely resembles that of FIGS. 11-13 of the '143 patent. Likewise, canard control surfaces may be provided to maintain 3-axis control in hover mode.

In FIG. 1, the wing assembly 12 is shown in a first position with the outer shell 22 fully extended, maintaining a favorable attitude for generating high lift with respect to the propeller slipstream. Airflow over the inner shell 20 remains attached due to the slot gap 82 between the trailing edge 84 of the outer shell 22 and the leading edge 24 of the inner shell 20 (if more wing elements are provided, there may be more slot gaps; for example, if three wing elements are provided, there may be two separate slot gaps). In use in this first position, the wing assembly 12 will stabilize in pitch about the axis 33 of the freely-rotating wing spar 17, in reaction to the air flow from the propeller. With the wing spar 17 unlocked and free to rotate relative to the fuselage/airframe, there is no pitching moment transferred to the airframe as the angle of attack of the wing elements changes.

The position of the wing assembly 12 shown in FIG. 1 (and the subsequent figures) is based on actual test results of the aforementioned powered research model, which had been elevated out of ground effect to more accurately gauge the pitch response of the wing assembly at altitude. Thus, it has been experimentally determined that the pitch stability of the wing assembly as claimed in the '143 patent extends to the situation where the wing assembly 12 consists of multiple elements, such as is shown and described here.

FIG. 1 also represents the real response of the model to a pitch-control input: The wing assembly 12 with the fully extended outer shell 22 has been shifted on the slides 30 to a nearly fully forward position where the wing assembly 12 stabilizes in the propeller slipstream with the chord line of the center-element airfoil of the outer shell at about an 11.0° angle of incidence relative to the air flow. This measurement is provided for illustrative purposes only, is based on the model experimental data and is not intended to limit the inventions described herein in any manner. From that point, shifting the wing assembly 12 fore and aft within a narrow range on the slides 30 results in the wing assembly 12 stabilizing at slightly different angles, so long as the spar 17 is unlocked and free to rotate. Thus, the control aspect of the principles set forth in the '143 patent extends to the multi-element wing assembly, such as is shown and described here.

FIG. 1 includes a generic representation of one of the linear actuators 74 that are situated at each wing tip 56, and which may be selectively activated to cause the wing elements to rotate relative to each other on the horizontal axis connecting the pivots 58 on each side. The actuator housing 76 is anchored to the first wing element 20, such as at its inner surface along a trailing edge, while the ram 78 is bolted to the outer shell 22, such as at a reinforced area of the inner surface of its leading edge. The attachment points are such as to allow pivotal or swinging motion of the actuator 74 at each end relative to the wing elements 20, 22, during extension or retraction of the ram 78. The ram 78 of the actuator 74 is fully extended in FIG. 1.

FIG. 1 represents the appropriate configuration of the wing assembly 12 for the aircraft to hover out of ground effect. There is high lift from the two wing elements 20, 22, enhanced by the slotted-flap effect. With the spar 17 free to rotate, the wing assembly 12 assumes (and maintains) a state of equilibrium, so there is no pitching moment transferred to the airframe. At altitude, hovering with the wing assembly 12 in stable pitch equilibrium, the pilot could choose to lock the wing spar 17, and let the stability of the wing system 12 be transferred to the airframe. That technique may be the preferred mode for landing and subsequent takeoff, both of which require precision maneuvering close to the ground. The '143 patent contains provisions for locking the wing spar (see e.g. column 8, beginning at line 59).

Figure 2:
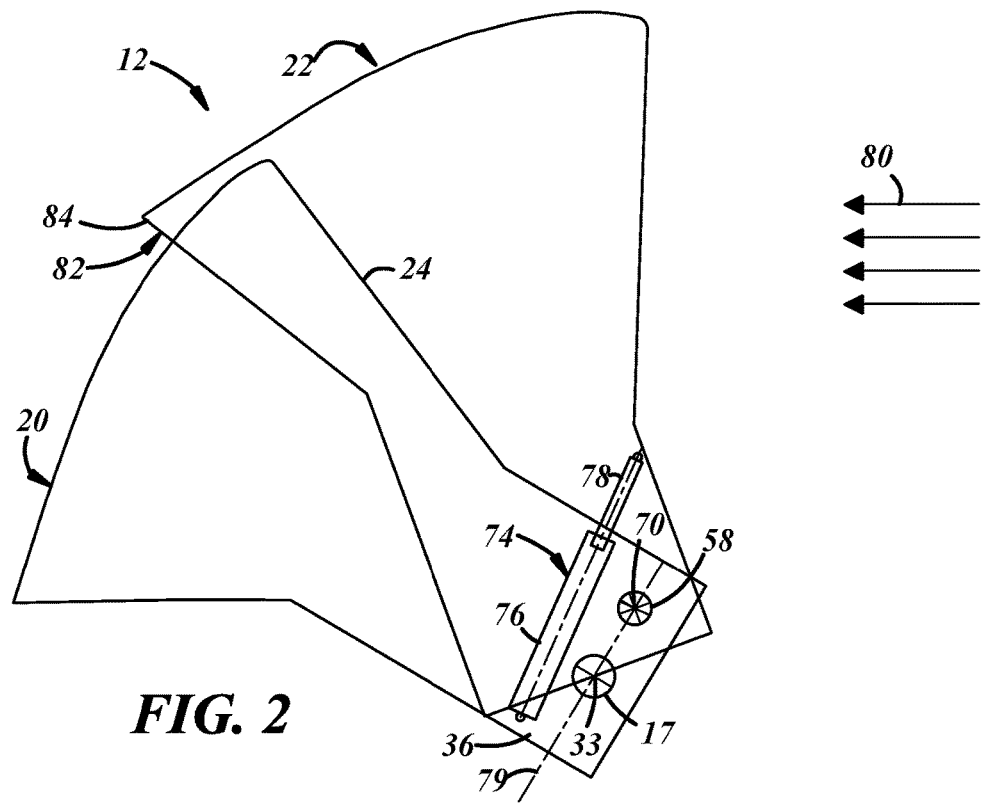

Once aloft, the wing assembly 12 may be moved to a second position or orientation which may enable higher speed cruising. In FIG. 2, the conversion of the wing assembly 12 is partially complete. The wing spar 17 is unlocked and the actuator rams 78 have begun to be withdrawn, rotating the outer shell 22 about the pivots 58 and overlapping (or further overlapping) the inner shell 20 with the outer shell 22. Even as the outer shell 22 pivots rearward (counterclockwise as viewed in the Figures), the change in the lift/drag force balance causes the inner shell 20 to rotate slightly forward (clockwise as viewed in the Figures) about the wing spar 17 as the system seeks a new equilibrium.

Figure 3:
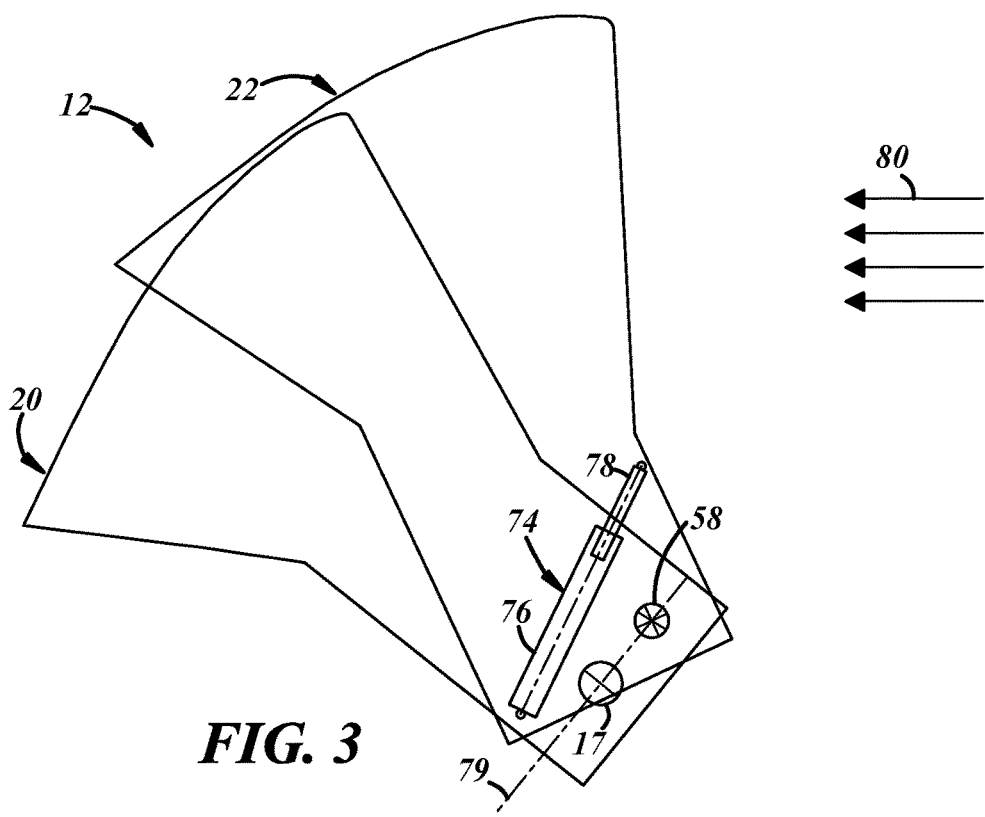
Figure 4:
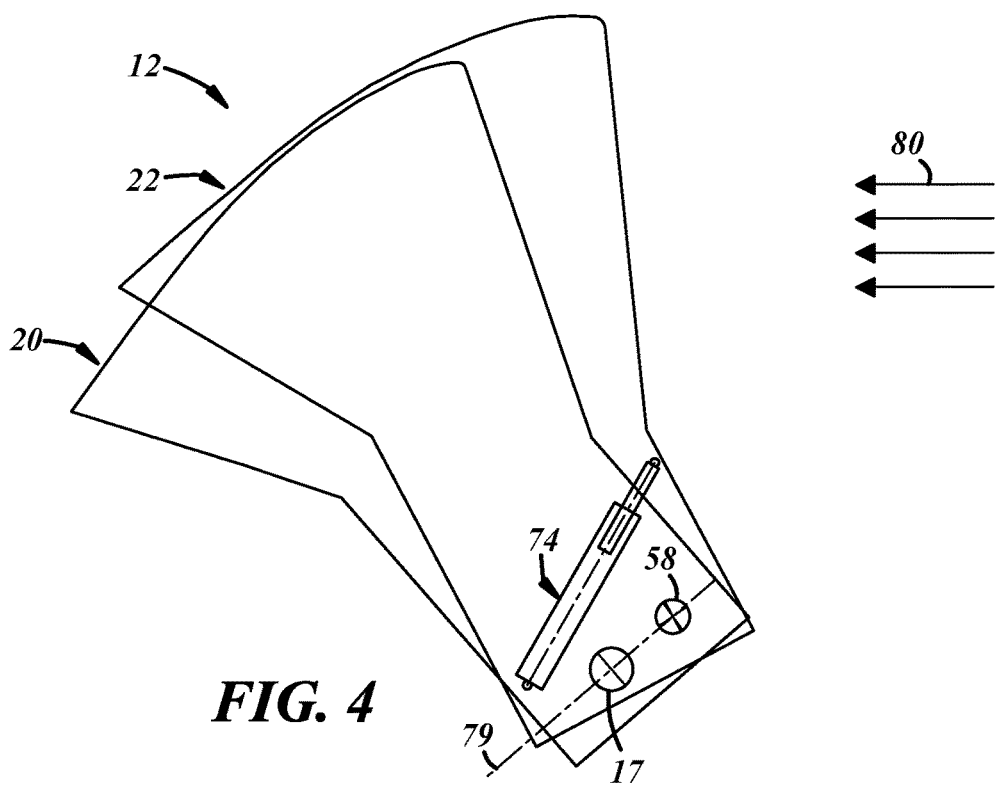

FIGS. 3 and 4 present two additional steps in the conversion of the wing assembly 12 from the first position to the second position. As the rams 78 are further withdrawn into their housings 76, the outer shell 22 is further rotated counterclockwise and the inner shell 20 further rotates clockwise, as the complete wing assembly 12 continues to adjust itself in the airflow and seek/maintain an equilibrium. It can be seen that the location of the pivots 58 allows the outer shell 22 to slip over the inner shell 20 without interference.

Figure 5:
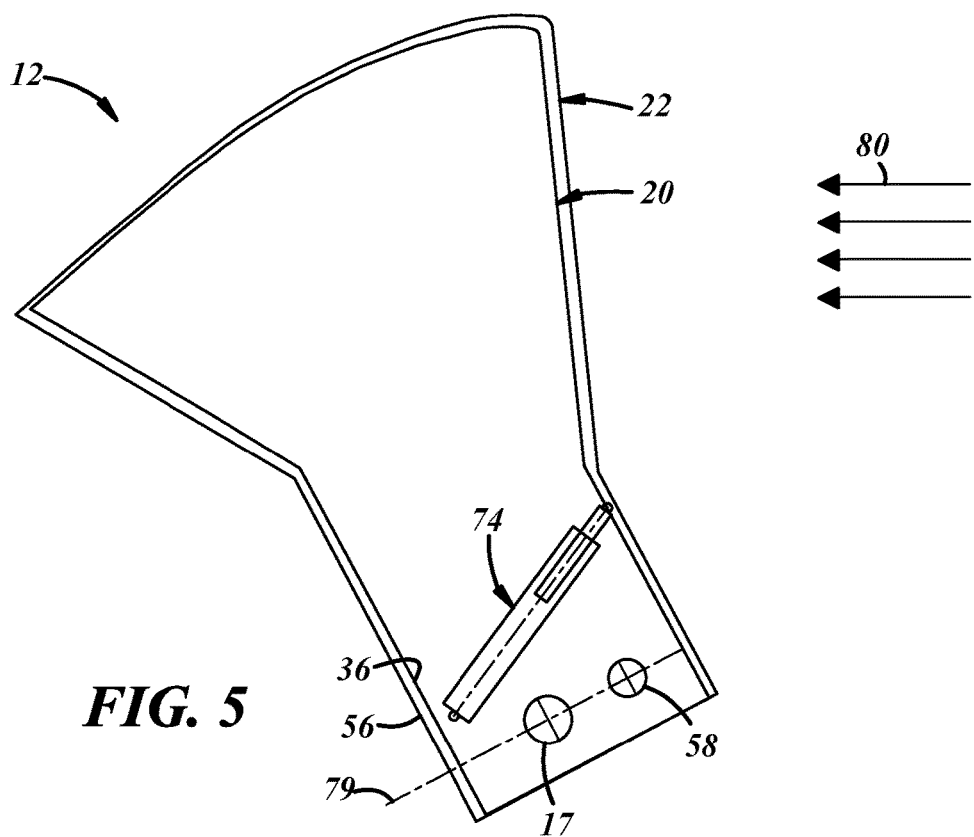

In FIG. 5 the retraction of the outer shell 22 is complete, and the two shells 20, 22 are fully nested. The wing assembly 12 has stabilized at a steep angle, but is able to maintain attached flow and significant lift in this orientation, as documented in experiments and strain-gage tests. A comparison of FIG. 5 with FIG. 1 shows how much rotation of the wing spar 17 has occurred during to this point in the wing assembly transition.

Up to this point in the transition process, no shifting or translation of the wing assembly 12 on the linear slides 30 has been indicated, as the initial position allowed for the maintenance of the lift/drag force balance during retraction of the outer shell 22. However, to achieve an efficient, high-speed cruise, the angle of incidence of the nested wing assembly 12 with respect to the free-stream airflow should be reduced from that shown. That reduction is accomplished by shifting the wing assembly 12 rearward on the linear slides 30 as is set forth in the '143 patent.

Figure 6:
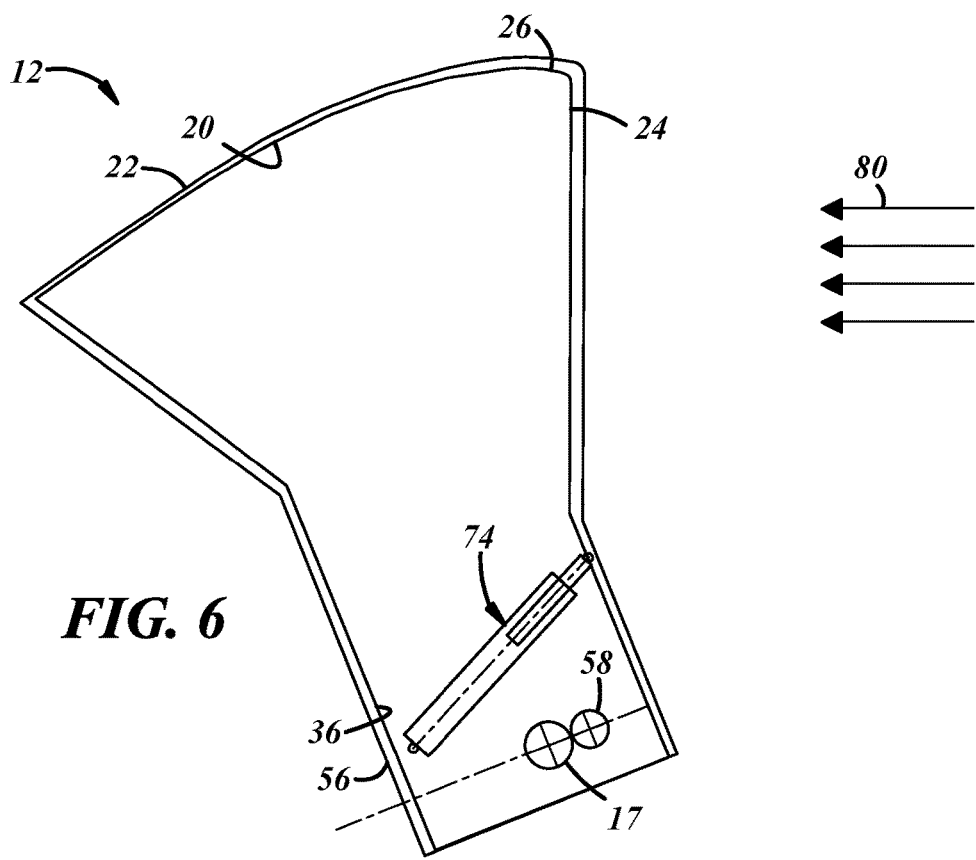
Figure 11:
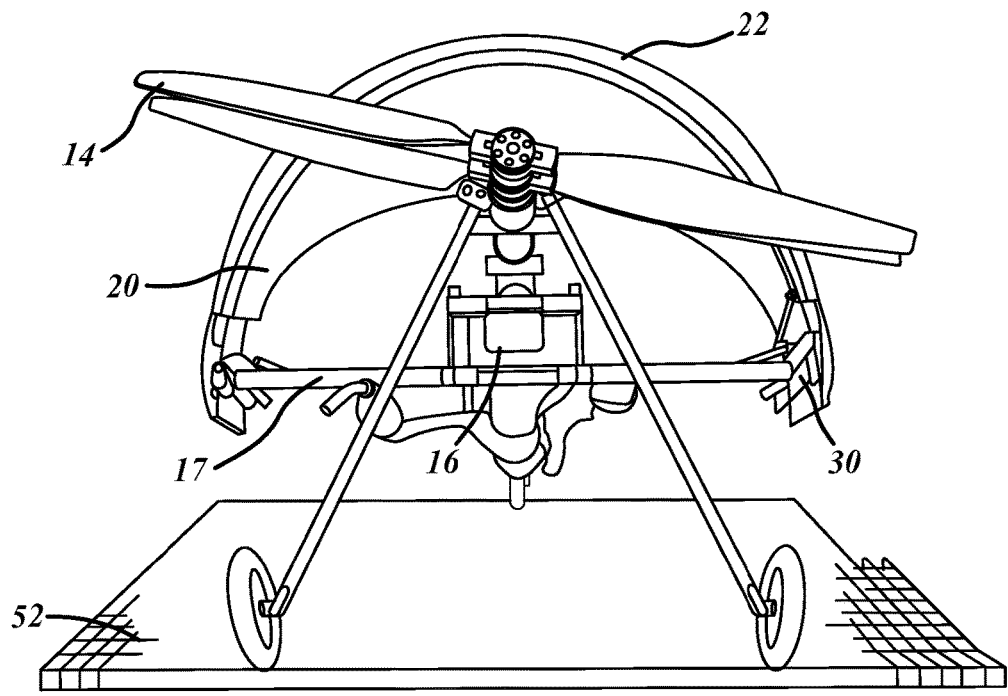
FIG. 11 is a front view of the aircraft.
Figure 12:
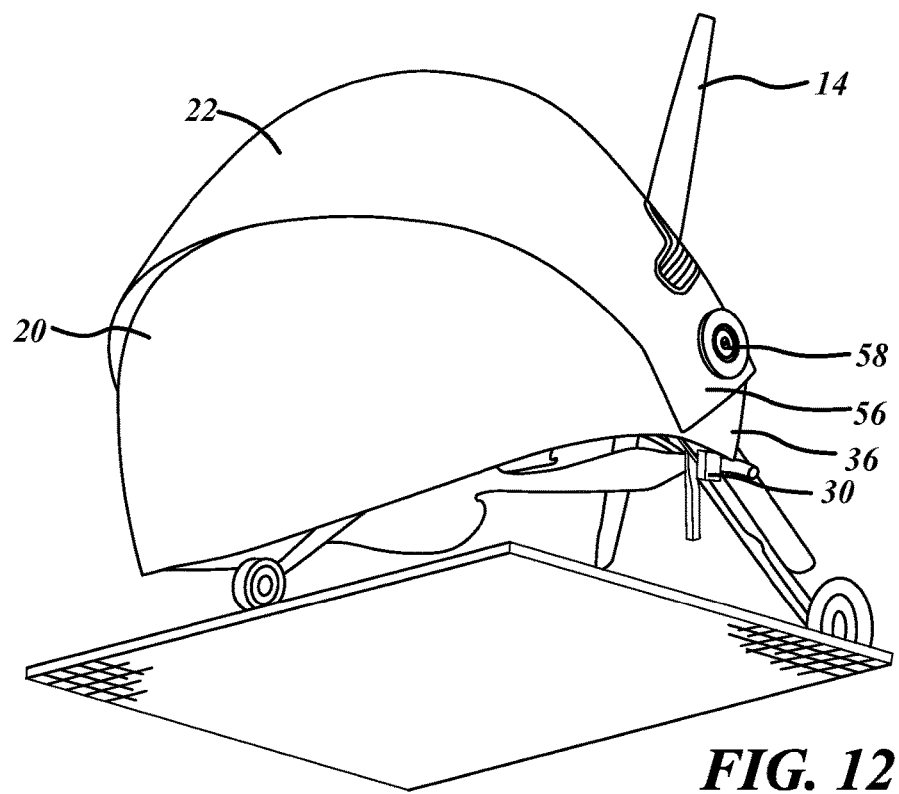
FIG. 12 is a rear perspective view of the aircraft.
Figure 13:
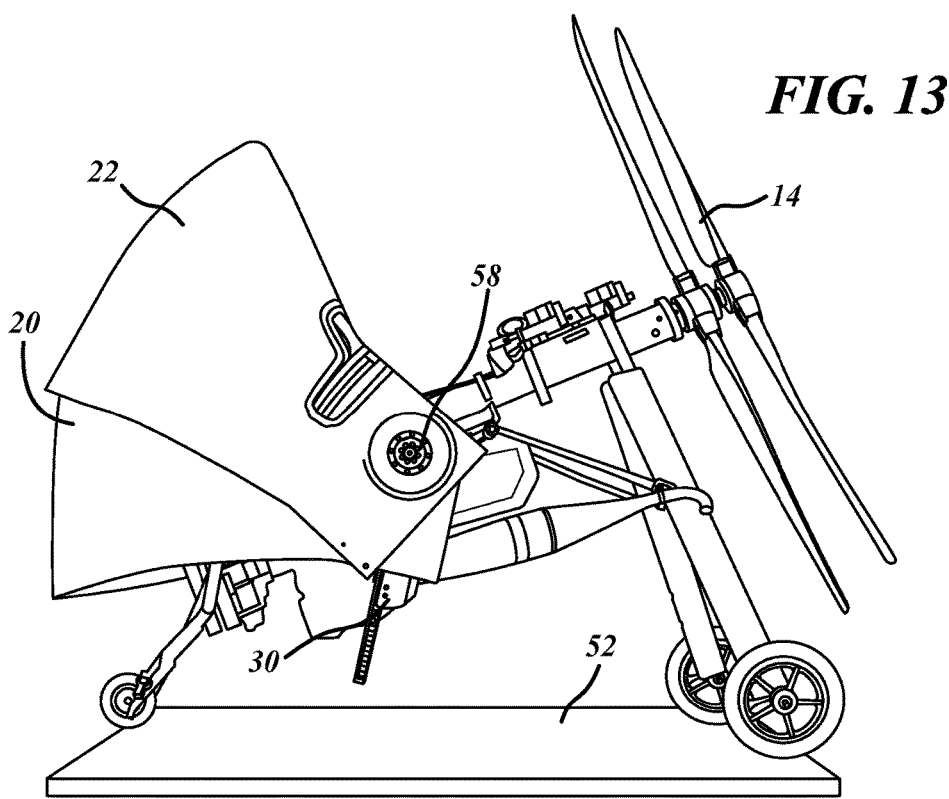
FIG. 13 is a side view of the aircraft showing the wing assembly in a position as it transitions from a first position to a second positions, similar to FIG. 3.
Figure 14:
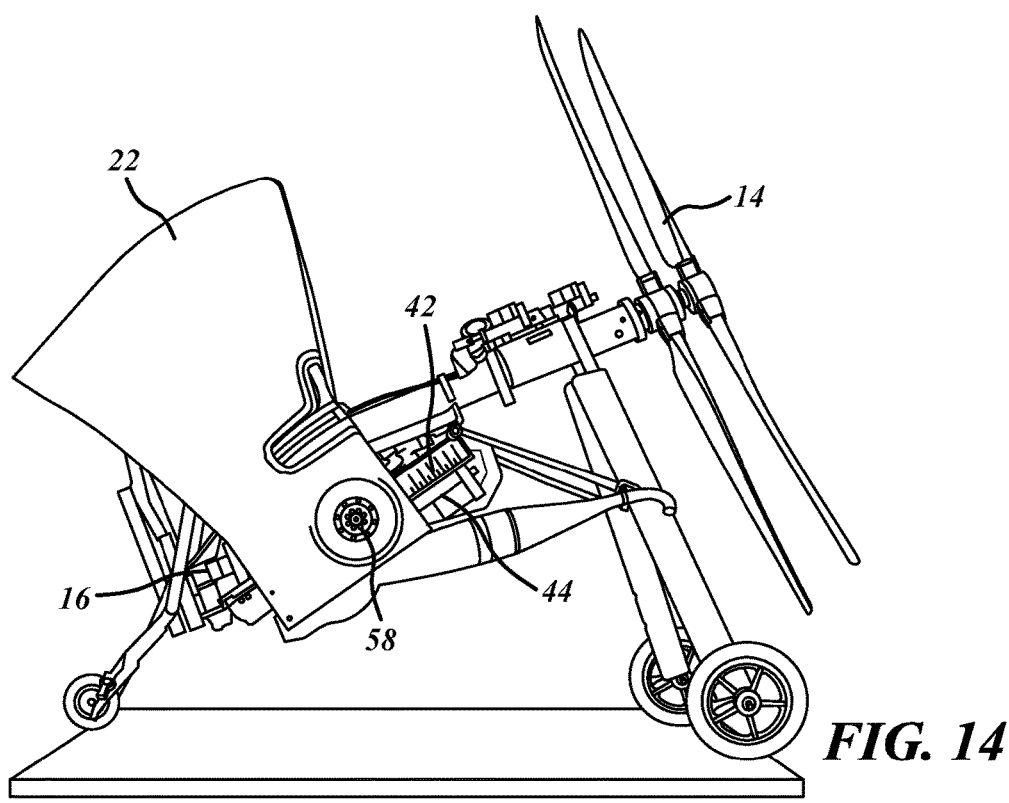
FIG. 14 is a side view of the aircraft showing the wing assembly in its second position, like FIG. 8, such as may be used for cruising.

FIGS. 6-8 show the wing assembly 12 moving aft on the slides 30, with the resulting decrease in wing angle at each stage, as the system self-adjusts in the airflow, rotating the unlocked wing spar 17 further clockwise. In FIG. 8, with the wing assembly 12 shifted full aft, the system has stabilized at about 5°-6° with respect to the free-stream airflow, a low-drag configuration well-suited for speed. The pilot may choose to lock the wing spar 17 at this point to help stabilize the airframe for long-distance and or high-speed navigation.

As stated earlier, the center of the wing spar 17 is the fixed reference in the 8-step figure sequence. It can be seen that the outer shell pivot 58 is ahead of the wing spar 17 in the first sequence of Figures, including the completion of the outer shell 22 retraction in FIG. 5, but the pivot 58 retreats progressively rearward in the later sequence of Figures, until it is well aft of the wing spar 17 in FIG. 8, which represents the conclusion of the full transition to cruise configuration.

It should be emphasized that the entire process of transition, as illustrated step-by-step in FIGS. 1-8, takes place with no pitching moment transferred to the airframe by the wing assembly 12. This is one feature that distinguishes the multi-element arc wing aircraft 10 from virtually every other deflected-slipstream VTOL yet devised.

In the FIG. 1-8 sequence, the outer shell 22 retraction and wing position transition were shown as separate events. However, the two operations could overlap or occur in concert to improve the lift/drag ratio of the wing assembly 12, thus promoting acceleration, rate of climb, and/or other desirable flying qualities of the aircraft 10 during transition. Also, FIGS. 1-8 indicate that the wing spar 17 rotates forward (clockwise) nearly 60° to complete the full transition from hover to cruise flight modes. The research model has demonstrated that the dynamic force balance stabilizing the multi-element wing assembly 12 in pitch is sufficiently robust to cause the requisite rotation of the wing spar 17 without motor assist. However, motor-assisted spar rotation, especially in response to sensor inputs, to improve the efficiency, safety, and reliability of the transition, may be used. It should also be stated that the process illustrated in FIGS. 1-8 is reversible, so that the aircraft 10 can be re-configured at any time for hover, vertical landing, or subsequent vertical takeoff.

The pitch stability and control principles for the arc wing assembly and aircraft set forth in the '143 patent can be extended in at least some ways to the case of an aircraft 10 with a multi-element arc wing assembly 12. The dynamic lift/drag force balance can stabilize a multi-element arc wing assembly about a lateral axis that runs between the wing tips 36, 56. The angle at which the multi-element arc wing assembly 12 stabilizes can be varied within a narrow range by shifting the wing assembly 12 fore and aft with respect to the rotatable wing spar 17, as per the second implementation of the wing assembly in the '143 patent.

The performance envelope of an aircraft 10 with a large propeller and a semi-rigid arc wing element 20 can be expanded to include VTOL capability by installing a second, closely-fitting arc wing element 22 over the first (main) wing element 20, allowing relative pivoted movement of the two nested wing elements, and then rotating the outer (second) wing element forward with respect to the inner (first) wing element. And such movements may be controlled using conventional actuators, linear or rotary. Such wing element movement may significantly increase the effective wing area, thereby converting more of the propeller slipstream into vertical lift. Depending somewhat on the location and inner workings of the pivot bearings that define the pivot between the wing elements, this operation creates a slotted-flap arrangement, wherein the first wing element (inner shell) functions as the flap, further enhancing vertical lift.

The forward rotation of the second (outer) wing element 22 with respect to the first (inner) wing element 20 qualifies the second wing element 22 to be considered a "slat" in aeronautical parlance. The extension of the slat (outer shell 22) does not result in an adverse angle of attack with the slipstream because the dynamic force balance causes the spar 17 of the wing assembly 12 to rotate in an appropriate manner to maintain a favorable angle of attack for the system as a whole. Due at least in part to the self-adjusting properties of the dynamic force balance, an aircraft 10 with the multi-element arc wing assembly 12 described above can smoothly transition from cruise to hover, and back to cruise, with no pitching moment imparted to the airframe by the wing system 12 at any time during the process provided that the center of gravity of the aircraft is at or near the center of the wing spar.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An aircraft, comprising:
a fuselage;
a wing spar rotatably carried by the fuselage;
a first wing element carried by the wing spar and rotatable with the wing spar, the first wing element slidably moveable relative to the fuselage and wing spar;
a second wing element connected to the first wing element so that the second wing element moves with the first wing element as the first wing element slidably moves relative to the fuselage and wing spar and for pivoted movement of the second wing element relative to the first wing element, wherein the second wing element at least partially overlaps the first wing element and the first and second wing elements are moveable to a plurality of positions wherein the amount that the second wing element overlaps the first wing element varies to vary the effective combined wing area of the wing elements.

2. The aircraft of claim 1 which also includes an actuator coupled to the second wing element to move the second wing element about its pivot.

3. The aircraft of claim 1 wherein the first and second wing elements are arcuate.

4. The aircraft of claim 3 wherein the second wing element defines an outer shell and the first wing element defines an inner shell that is at least partially nestable within the outer shell.

5. The aircraft of claim 1 which also comprises a pivot carried by the first wing element and wherein the second wing element is coupled to the pivot so that the second wing element can pivot relative to the first wing element.

6. The aircraft of claim 5 wherein the pivot is positioned forward of the wing tip center chord line relative to the direction of travel of the aircraft.

7. The aircraft of claim 1 which also comprises a source of propulsion and the first and second wing elements are disposed in a slipstream of the source of propulsion.

8. The aircraft of claim 2 wherein the actuator is a linear actuator having a moveable ram and a housing and wherein either the housing or the ram is fixed to the first wing element and the other of the housing and the ram is connected to the second wing element.

9. The aircraft of claim 1 which also includes linear slides to which the wing tips of the first wing element are connected and at least one linear actuator that drives movement of the first wing element along the linear slides.

10. The aircraft of claim 9 wherein two linear slides are provided with each linear slide attached to a separate one of the wing tips of the first wing element, and wherein the axes of the slides are parallel to each other and at right angles to the wing spar.

11. The aircraft of claim 1 wherein the wing spar is rotatably carried by the fuselage.

12. The aircraft of claim 5 wherein the pivot is defined by two bearings with one bearing coupled to one of the wing tips of the second wing element and one of the wing tips of the first wing element, and the other bearing coupled to the other of the wing tips of the second wing element and the other of the wing tips of the first wing element.

13. The aircraft of claim 12 wherein the wing spar is rotatable about an axis relative to the fuselage and the axes of the bearings are parallel to the axis of rotation of the wing spar.

14. The aircraft of claim 2 which also includes linear slides to which the wing tips of the first wing element are connected and at least one linear actuator that drives movement of the first wing element along the linear slides, wherein said at least one linear actuator is separate from said actuator coupled to the second wing element.

15. A wing assembly for an aircraft, comprising:
a first wing element having a pair of wing tips, an arcuate shape along at least a portion of its span between the wing tips;
a second wing element having a pair of wing tips pivotably connected to the wing tips of the first wing element so that the first wing element and second wing element may pivot relative to each other about a common axis, the second wing element having an arcuate shape along at least a portion of its span between its wing tips and being nestably received over the first wing element to a varying degree between a first position and a second position of the wing assembly; and
an actuator directly coupled to both the first wing element and to the second wing element to pivot the second wing element relative to the first wing element.

16. The wing assembly of claim 15 wherein the first wing element is substantially completely received within the second wing element in the second position.

17. The wing assembly of claim 15 wherein the first and second wing elements have a width in the direction of travel of an aircraft with which the wing elements are used, and the total combined width of the wing assembly varies between the first and second position.

18. The wing assembly of claim 15 wherein the first and second wing elements each have a leading edge and a trailing edge, where the leading edge is forward of the trailing edge relative to the direction of travel of an aircraft with which the wing elements are used, and a slot gap is provided between the trailing edge of the outer shell and the leading edge of the inner shell.

19. The aircraft of claim 2 wherein the actuator is coupled to the first wing element and to the second wing element to pivot the second wing element relative to the first wing element.

20. The wing assembly of claim 15 wherein the actuator is a linear actuator having a moveable ram and a housing and wherein either the housing or the ram is fixed to the first wing element and the other of the housing and the ram is connected to the second wing element.

* * * * *